United States Patent [19]

Shimizu et al.

[11] Patent Number: 5,153,661
[45] Date of Patent: Oct. 6, 1992

[54] APPARATUS AND METHOD FOR LASER RECORDING OF AN IMAGE WITH MEANS FOR FEEDING A MATERIAL

[75] Inventors: Yoshio Shimizu; Masahiro Yamamoto, both of Kyoto, Japan

[73] Assignee: Dainippon Screen Mfg. Co., Ltd., Kyoto, Japan

[21] Appl. No.: 628,118

[22] Filed: Dec. 14, 1990

[30] Foreign Application Priority Data

Dec. 25, 1989 [JP] Japan ............................ 1-149662[U]
Dec. 25, 1989 [JP] Japan ............................ 1-149663[U]
Dec. 25, 1989 [JP] Japan ............................ 1-149666[U]

[51] Int. Cl.⁵ ............................................. G03G 21/00
[52] U.S. Cl. ................................... 355/309; 83/208; 83/209; 355/310; 355/321
[58] Field of Search ............... 355/308, 309, 310, 311, 355/316, 317, 321, 203, 204, 208; 83/208–210, 369; 271/3, 188; 226/113

[56] References Cited

U.S. PATENT DOCUMENTS

| | | | |
|---|---|---|---|
| 3,639,053 | 2/1972 | Spear, Jr. ........................... | 355/310 |
| 3,743,413 | 7/1973 | Sharp et al. ....................... | 355/310 X |
| 3,951,023 | 4/1976 | Ashburner ......................... | 355/310 X |
| 4,046,470 | 9/1977 | Yamamoto ......................... | 355/310 |
| 4,110,027 | 8/1978 | Sato et al. ......................... | 355/309 X |
| 4,415,255 | 11/1983 | Huber et al. ..................... | 355/310 X |

FOREIGN PATENT DOCUMENTS 63-71061 3/1988 Japan .

*Primary Examiner*—A. T. Grimley
*Assistant Examiner*—William J. Royer
*Attorney, Agent, or Firm*—Lowe, Price, Le Blanc & Becker

[57] ABSTRACT

An apparatus for laser recording of an image onto a selected length of photosensitive material has a loosening device positioned downstream from a feeding device for feeding the photosensitive material in a first direction so that the photosensitive material is loosened in a second direction to form a loop of a predetermined length selected by a user. In one aspect of the invention, the leading edge of the photosensitive material is held at a recording position. A cutting device is disposed between the loosening device and the feeding device and cuts off a photosensitive material sheet from the photosensitive material. An image to be reproduced is then recorded onto the photosensitive material sheet.

16 Claims, 15 Drawing Sheets

APPARATUS AND METHOD FOR LASER RECORDING OF AN IMAGE WITH MEANS FOR FEEDING A MATERIAL

BACKGROUND OF THE INVENTION

1. Field of the Invention

This invention relates to an image recorder, such as a flat-bed type color scanner, for recording an image to be reproduced onto a photosensitive material sheet. In the image recorder, a photosensitive material is drawn out of a roll of photosensitive material, and then is fed in the feed scanning direction while being scanned by a laser beam in the primary scanning direction, which is approximately perpendicular to the feed scanning direction, whereby the image is recorded onto the photosensitive material.

2. Description of the Prior Art

In an image recorder of this type, a long photosensitive film (hereinafter referred as a "film") is stored in the form of a roll and is accommodated within a film case. A film drawn out of the film case is held between a main roller and nip rollers. The film is fed in the feed scanning direction as the main roller rotates. The image recorder comprises an expose-scanning unit. The expose-scanning unit sweeps a laser beam across a film in the primary scanning direction in synchronism with a feeding of the film in the feed scanning direction thereby to record an image onto the film. The recorded film is further fed by a desired length in the feed scanning direction, and thereafter automatically cut off by a cutter located in the image recorder. Thus, a desirable length film sheet with the image reproduced thereon is obtained.

As well known in the art, stable and smooth feeding of the film in the feed scanning direction is indispensable for recording an excellent quality image. In the image recorder as above, the film is fed from the film case as the main roller rotates while being held by a pair of introduction rollers. This causes the film to be in tension in the reverse direction to the feed scanning direction and hence to slip between the main roller and the nip rollers, often resulting in unstable feeds. Force required to draw the film out of the roll, in particular, changes according to amount of remaining film in the roll. Thus, changes in amount of the remaining film exert influence on the feeding of the film.

Various techiques have been proposed to overcome the problem described above, one of them being an image recorder of Japanese Patent Laid-Open Gazette No. 63-71061.

FIG. 1 is a sectional view of a conventional image recorder. The conventional image recorder includes a pair of introduction rollers 101. The introduction rollers hold a leading edge portion of a film drawn out of a roll 105. A film 103 is drawn out of the roll 105 as the introduction rollers rotate. A main roller 102 rotates while holding the film 103 in cooperation with nip rollers 106, whereby the film 103 is fed in the feed scanning direction. A laser beam 104 scans the advancing film 103 in the primary scanning direction, the scanning being synchronized with the feeding of the film 103. Hence, an image is reproduced on the film 103. In this image recorder, the film 103 is loosened between the introduction rollers 101 and the main roller 102 while a leading edge portion 103a of the exposed film 103 being downwardly pulled. This protects the film 103 from undersirable tension which causes the film 103 to slip on the main roller 102. Consequently, image recording is attained which is free from slippage of the film 103 on the main roller 102 as described above.

After the image recording, the main roller 102 rotates couter-clockwise to rewind the exposed film 103. The main roller 102 once again rotates, this time in the clockwise direction, thereby to allow the film 103 to advance a desired distance toward a cutter 107 and guide rollers 108, so that the cutter 107 cuts off the film 103. A film sheet thus obtained has a desirable length and a reproduced image recorded thereon.

Yet, there arise several other problems as follows: While the film is fed backward, the film tends to be folded between the main roller 102 and either the introduction rollers 101 or a film case 105a, so that an unexpected loop is formed. In order to overcome this problem, the conventional image recorder employs a guiding unit 109 for preventing the film 103 from forming a loop. The image recorder also employs a switching unit for changing the feed direction. The switching unit changes the feed direction of the film 103 toward a downward direction or toward a direction to the cutter 107. In addition, since the film 103 must be fed backward after being exposed, time required for obtaining one film sheet, or a cycle time, becomes long. This will eventually deteriorate the production efficiency of the image recorder.

SUMMARY OF THE INVENTION

The present invention is directed to an image recorder. The image recorder comprises: means for feeding a photosensitive material in a first direction; means for loosening the photosensitive material in a second direction approximately perpendicular to the first direction, the loosening means being positioned downstream from the feeding means relative to said first direction; means, disposed between the feeding means and the loosening means, for cutting off the photosensitive material, whereby a sheet of photosensitive material is cut off from the photosensitive material, the photosensitive material sheet being of a predetermined length; and means for recording an image to be reproduced onto the photosensitive material sheet.

The present invention is also directed to a method of recording an image onto a photosensitive material sheet. The method includes: feeding a photosensitive material in a first direction by a predetermined length; holding a leading edge portion of the fed photosensitive material; loosening the photosensitive material to thereby form a loop of the photosensitive material, a size of the loop being corresponding to a length of a photosensitive material sheet to be recorded; cutting off the photosensitive material at a cutting position, the cutting position being located upstream from the loop relative to the first direction, whereby a photosensitive material sheet is cut off from the photosensitive material; and recording an image to be reproduced onto the photosensitive material sheet.

The present invention is also directed to means for urging a photosensitive material toward a main roller. The means comprises: a body; a pair of nip roller extending in parallel to the main roller; a first and a second supporting members for supporting the nip rollers, the first supporting member being close to one end of the main roller, the second supporting members being close to another end of the main roller; and a mechanism, coupled to the first and the second supporting members, for moving the first and the second supporting members toward the main roller so that the nip rollers are brought into a contact with the main roller in order.

Accordingly, an object of the present invention is to provide an image recorder in which a photosensitive material is stably fed.

Another object is to provide an image recorder in which time required for recording an image onto a photosensitive material sheet is reduced.

Another object is to provide an image recorder which prevents a photosensitive material from dropping into the image recorder.

Another object is to improve means for urging a photosensitive material toward a main roller, which is required to bring a photosensitive material into contact with the main roller.

According to the present invention, the photosensitive material is cut off by the cutting means prior to image recording by means of the recording means thereby to produce a sheet of a preset length, whereafter an image is reproduced on the sheet. Therefore, a sheet needs not to be fed in a counter feed scanning direction after exposure thereon. This allows the novel image recorder to omit a unit which is indispensable for a conventional image recorder to reversely feed a film. Hence, a simple structure image recorder with a short cycle time can be attained.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Figure 1:
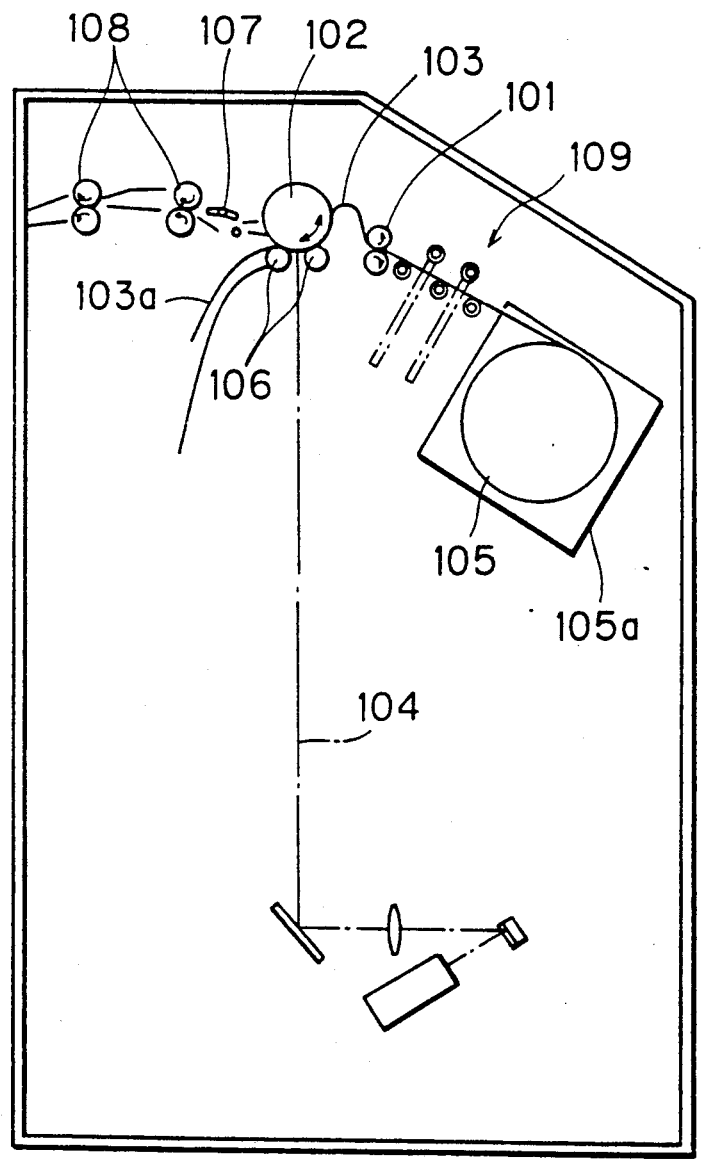
FIG. 1 is a sectional view of a conventional image recorder.
Figure 2:
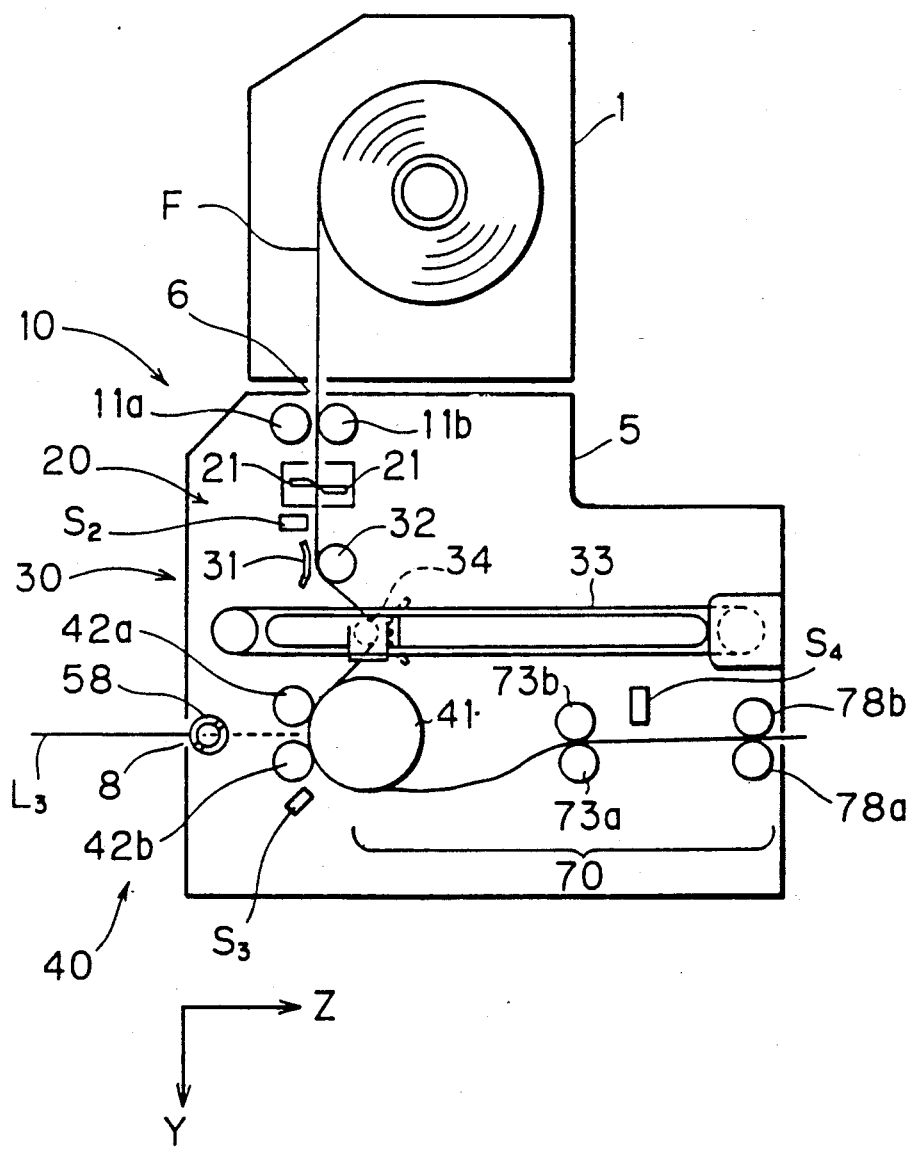
FIGS. 2 and 3 are a schematic side view and a perspective view of an image recorder according to the first embodiment of the present invention, respectively.
Figure 3:
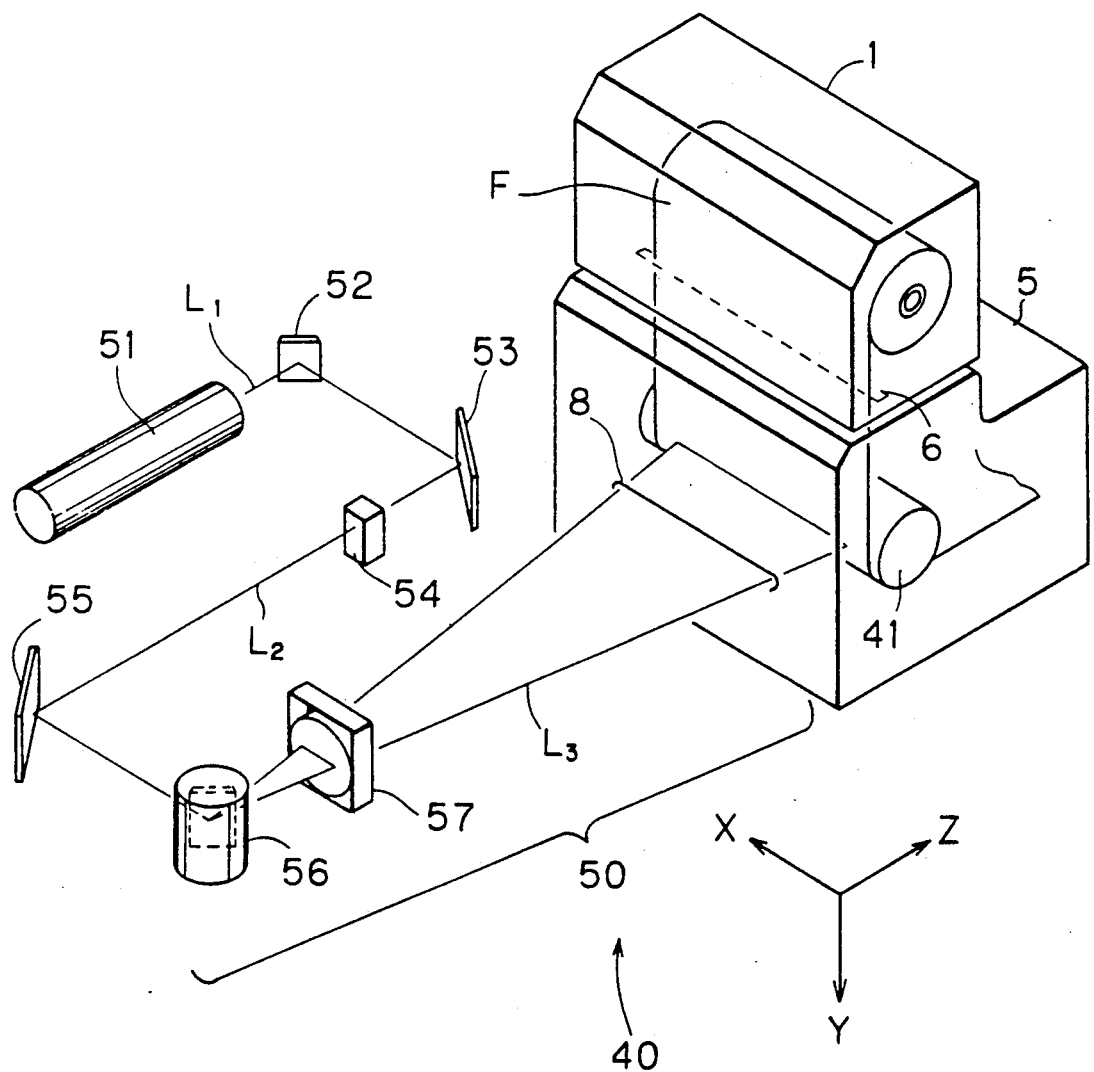

FIGS. 2 and 3 are a schematic side view and a perspective view of an image recorder according to the first embodiment of the present invention, respectively.

In this novel image recorder, a laser beam $L_3$ scans a film F in the primary scanning direction X which is approximately perpendicular to the feed scanning direction Y while the film F is fed in the feed scanning direction Y, whereby a reproduced image is recorded onto the film F.

The image recorder comprises: a body 5; an introduction roller unit 10 for drawing the film F out of a film case 1 and feeding the film F in the feed scanning direction Y; a cutter unit 20 for cutting the film F; a travel roller unit 30 for loosening the film F in the direction Z approximately perpendicular to both the primary scanning direction X and the feed scanning direction Y; an expose-scanning unit 40 for sweeping the laser beam in the primary scanning direction X as the film F is fed in the feed scanning direction Y, thereby to record a reproduced image onto the film F; and a carrier unit 70 for carrying the film F, which has the reproduced image recorded thereon, out of the body 5. The image recorder also comprises a control unit not shown. The control unit governs the image recorder overall according to signals from various sensors of respective units thereof and/or to instructions from an operation panel not shown.

As in FIG. 2, the top frame of the body 5 has an opening 6 whose position precisely corresponds to the film case 1. The film F is drawn off the film case 1 disposed above the body 5, and then is guided into the body 5 through the opening 6.

Figure 4:
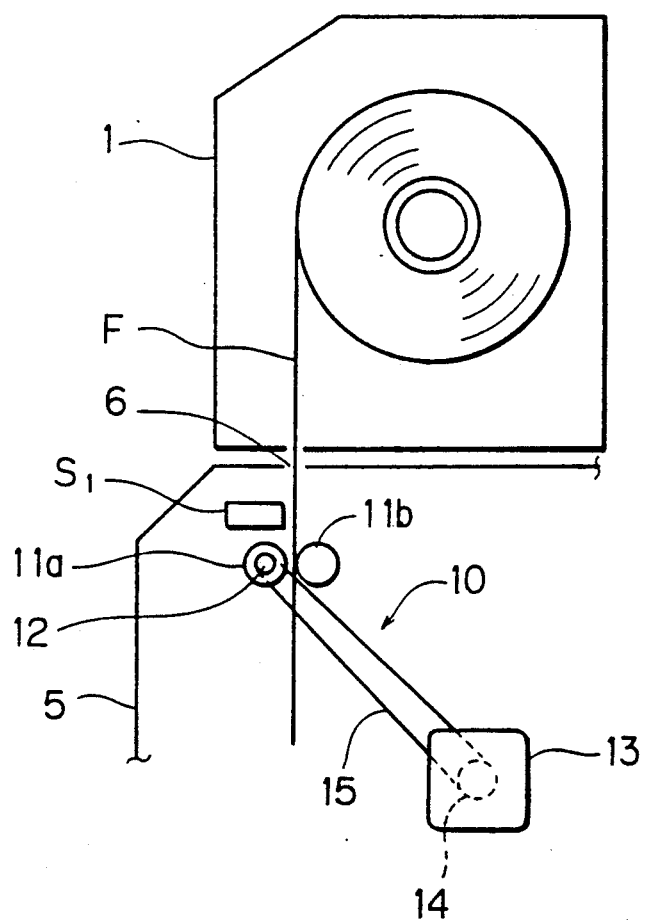
FIG. 4 is a schematic sectional view of an introduction roller unit.

FIG. 4 is an enlarged view of the introduction roller unit 10. The introduction roller unit 10 is disposed just below the opening 6 of the body 5. To be precise, a pair of introduction rollers 11a and 11b are mounted for rotation on the body 5 just below the opening 6. A lever not shown is connected to the introduction rollers 11a and 11b, so that the introduction rollers 11a and 11b are contacted with or separated from each other by operation of the lever.

A pulley 12 is linked to the introduction roller 11a, while another pulley 14 is mounted to a rotary shaft of a motor 13 which is fixed to the body 5. A belt 15 is then stretched about the pulleys 12 and 14. Thus, the driving force of the motor 13 is transmitted to the introduction roller 11a, and the introduction rollers 11a and 11b, holding the introduced film F in their tight contact with each other, so as to feed the film F in the feed scanning direction Y according to rotation of the motor 13.

A check sensor $S_1$ is located between the opening 6 and the introduction roller 11a to sense the introduction of the film F into the body 5.

The cutter unit 20, which is attached to the body 5 just below the introduction rollers 11a and 11b (see FIG. 2), includes a pair of cutters 21 and 21, and a cutter driving device not shown for driving the cutters 21 and 21.

Figure 5:
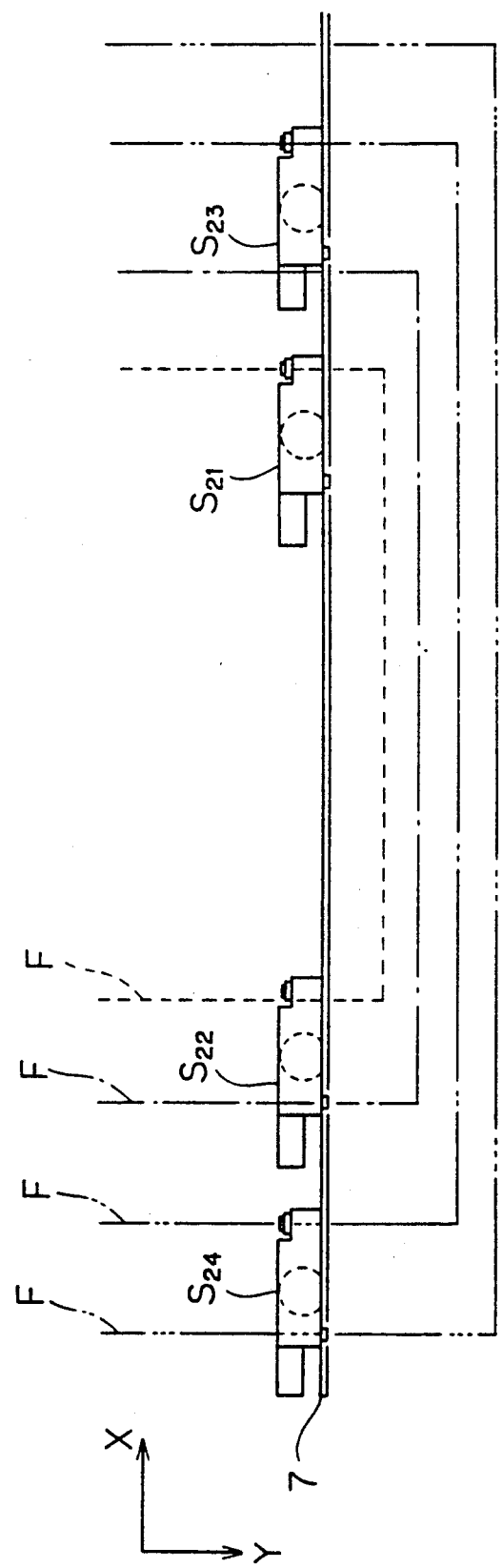
FIG. 5 is a side view of a width detection sensor group.

Provided just below the cutter unit 20 is a width detection sensor group $S_2$ for detecting a width of the film F. FIG. 5 is a plan view of the width detection sensor group $S_2$. The width of the film F is 6 inches (dotted line), 8 inches (dash-and-dot line), 10 inches (dash-and-two-dot line) or 12 inches (dash-and-three-dot line), in general. In this embodiment, as shown in FIG. 5, width detection sensors $S_{21}$, $S_{22}$, $S_{23}$ and $S_{24}$ are arranged at regular intervals on a supporting member 7, which is fixed to the body 5, to detect the respective four widths.

For instance, when the leading edge portion of an eight-inch-wide film F reaches the position corresponding to the width detection sensor group $S_2$ as shown by dash-and-dot line in FIG. 5, only the two detection sensors $S_{21}$ and $S_{22}$ are turned on to send signals to the control unit. Thus, the width of the film F is automatically determined as 8 inches.

As seen in FIG. 2, the travel roller unit 30 is attached adjacent to the width detection sensor group $S_2$. The travel roller unit 30 includes a guiding plate 31 fixed to the body 5 just below the width detection sensor group $S_2$. The travel roller unit 30 also includes a guiding roller 32 mounted for rotation on the body 5 such that it faces the guiding plate 31. Thus, the film F advances between the guiding plate 31 and the guiding roller 32.

A travel guide 33 is fixed to the body 5 below the guiding plate 31 and the guiding roller 32 in such a manner that it extends in the direction Z. A travel roller 34 is guided by the travel guide 33 and slides in the direction Z along the travel guide 33.

A main roller 41 of the expose-scanning unit 40 is mounted close to the travel roller unit 30 for rotation on the body 5. A nip roller (best seen in FIGS. 6A and 6B) for urging the film toward the main roller is provided adjacent to the main roller 41. The nip roller unit A includes a pair of nip rollers 42a and 42b which face the main roller 41.

Figure 6A:
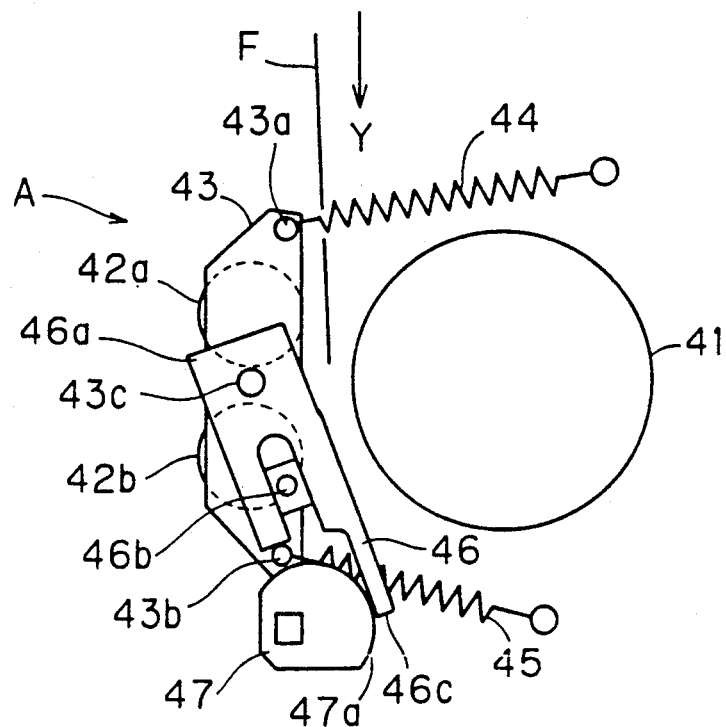
FIGS. 6A and 6B are schematic views of a nip roller unit for urging a film against a main roller.
Figure 6B:
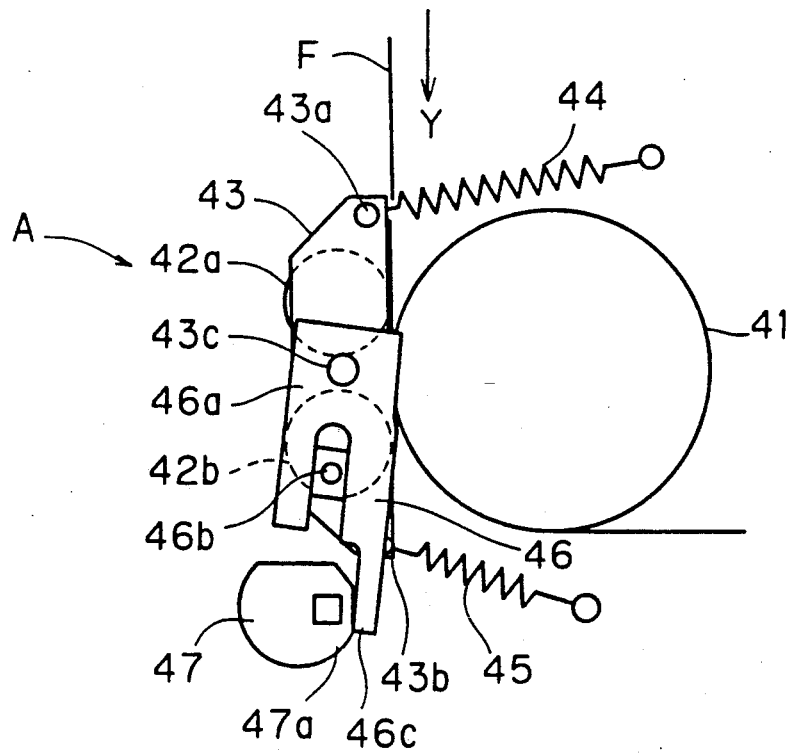
Figure 6C:
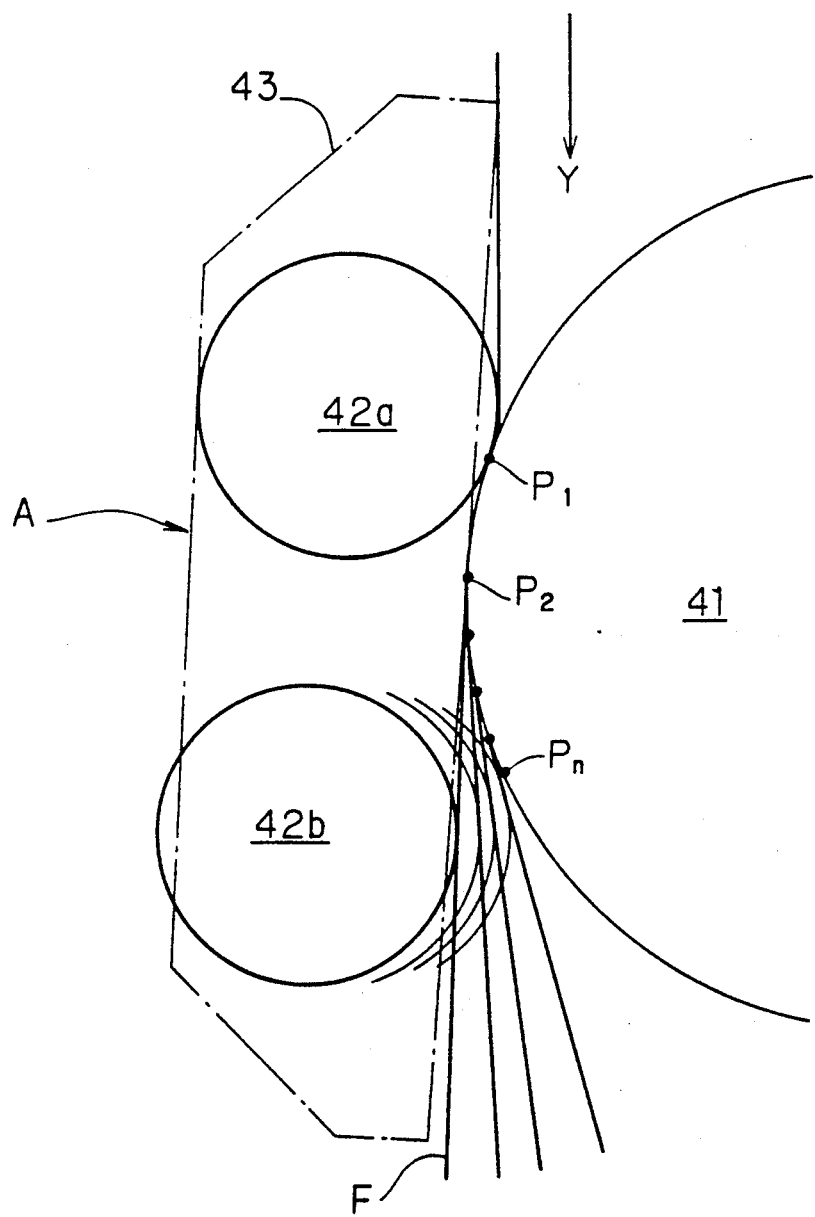
FIG. 6C is an enlarged detail view showing operation of the nip roller unit.

FIGS. 6A and 6B are schematic views of the nip roller unit, the former being not for urging the film toward the main roller 41, whereas the latter being disposed for urging the film toward the main roller 41, as best seen in FIG. 6C.

In the nip roller unit A, the nip rollers 42a and 42b are rotatably supported at a preset interval to two trapezoidal supporting members 43, and can be brought into contact with or separated from the main roller 41. The nip rollers 42a and 42b are each parallel to the main roller 41.

The two trapezoidal members 43 are close to the end portions of the main roller 41 and facing each other, and carry the nip rollers 42a and 42b in a manner such that they sandwich the nip rollers 42a and 42b.

One end portion 43a of the supporting member 43 is linked to an end of a first spring 44 which has another end fixed to the body 5. Another end portion 43b of the supporting member 43 is linked to an end of a second spring 45 another end of which is also fixed to the body 5. Thus, the first and second springs 44 and 45 apply a pulling force to the supporting member 43 so that the supporting member 43 moves toward the main roller 41. The first spring 44 preferably possesses pulling force greater than that of the second spring 45.

An end portion 46a of an operation member 46 is linked for rotation to the approximately center portion of the supporting member 43 through a pin 43c, while the approximately center portion 46b of the operation member 46 is supported for rotation to the body 5. Thus, the supporting member 43 moves toward and away from the main roller 41 according to clockwise and counter-clockwise rotation of the operation member 46 about the approximately center portion 46b.

An eccentric cam 47 is so positioned that it contacts with an end portion 46c of the operation member 46. The first and second springs 44 and 45 urge the end portion 46c of the operation member 46 into engagement with the cam surface 47a, so that eccentric rotation of the eccentric cam 47 adjusts the position of the operation member 46 which is in rotation.

To be precise, when the eccentric cam 47 eccentrically rotates into the position of FIG. 6A, the operation member 46 is biased counter-clockwise about the approximately center portion 46b. This in turn allows the supporting member 43, which is linked to the end portion 46a of the operation member 46, to move to the left against the force of the first and the second springs 44 and 45. Accordingly, the nip rollers 42a and 42b are separated from the main roller 41.

The supporting member 43 is inclined at an angle of 5 degrees with respect to the feed scanning direction Y inasmuch as the pulling force of the first spring 44 is greater than that of the second spring 45 as mentioned earlier. This permits the nip roller 42a to be nearer (even though slightly) the main roller 41 than the nip roller 42b.

On the contrary, when the eccentric cam 47 rotates clockwise 180 degrees from the position of FIG. 6A, following the movement of the cam face 47a of the eccentric cam 47, the operation member 46 rotates clockwise about the approximately center portion 46b by the force of the springs 44 and 45. As a result, the supporting member 43 linked to the operation member 46 approaches the main roller 41. This shift of the supporting member 43 in turn brings about similar movement of the nip rollers 42a and 42b toward the main roller 41, thus urging the nip rollers 42a and 42b toward the main roller 41.

As in FIG. 3, a scanning unit 50 of the expose-scanning unit 40 includes a laser source 51. In the scanning unit 50, a laser beam $L_1$ leaving the laser source 51 impinges onto an acousto-optic modulating element 54 through mirrors 52 and 53. The acousto-optic modulating element 54 turns the laser beam $L_1$ on-off in response to a control signal which corresponds to an image to be recorded. A laser beam $L_2$ thus modulated by the acousto-optic modulating element 54 is then via a mirror 55 transmitted to a deflecting unit, i.e., a galvanometer mirror 56. A deflected laser beam $L_3$ is finally focused by an f$\theta$ lens 57 upon a surface of the film F on the main roller 41. A side frame of the body 5 has an opening 8 for guiding the laser beam $L_3$ from the scanning unit 50 into the body 5. A mechanical shutter 58 is on the optical path of the laser beam $L_3$ (FIG. 2).

Figure 7A:
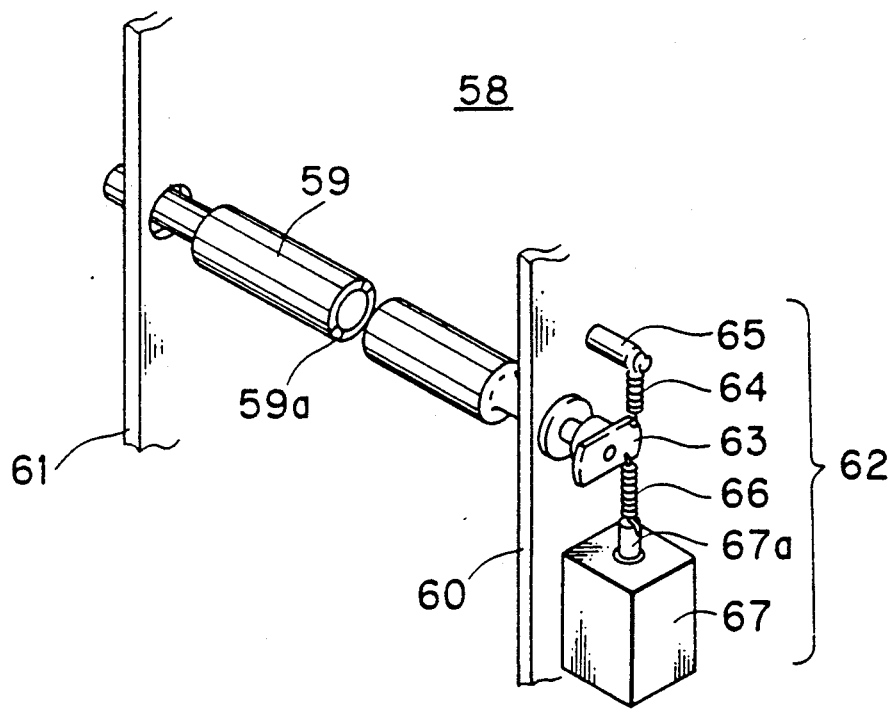
FIGS. 7A and 7B perspective views of a machine shutter.
Figure 7B:
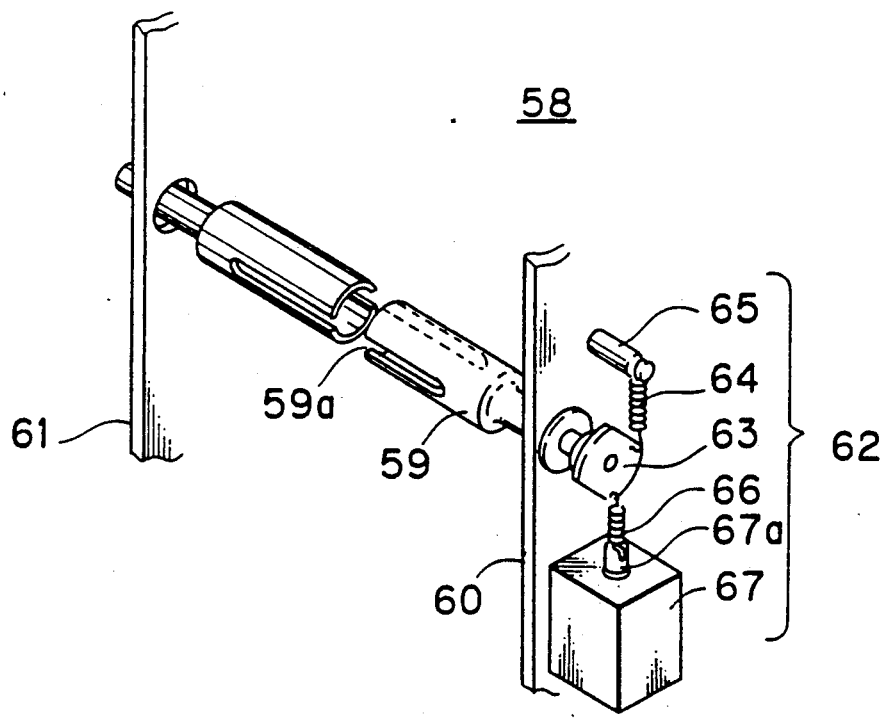

FIGS. 7A and 7B are perspective views of the mechanical shutter 58. FIG. 7A shows the mechanical shutter as it is closed whereas FIG. 7B showing the same as it is open.

In FIGS. 7A and 7B, a member 59 shaped in an approximately cylinder is supported for rotation by holders 60 and 61 each of which is secured to the body 5. The cylindrical member 59 has a slit 59a which corresponds to a scanning area of a laser beam.

The cylindrical member 59 is connected on its one end to a slit driving unit 62. The slit driving unit 62 drives the cylindrical member 59 into rotation. Thus, the slit 59a is positioned on-off the optical path of the laser beam $L_3$. To be more precise, the slit driving unit 62 is provided with a plate 63 which is fixed at one end of the cylindrical member 59. The plate 63 is in turn connected in its upper right portion to an end of a third spring 64 which is linked to a fixed pin 65 laterally projecting from the supporting holder 60. The plate 63 is connected in its lower right portion to an end of a fourth spring 66 which is in turn linked to a movable pin 67a mounted to a solenoid 67.

When the solenoid 67 is not operating (FIG. 7A), the balance of the spring force of the springs 64 and 66 allows the movable pin 67a to move upward. As a result, the slit 59a withdraws from the optical path of the laser beam $L_3$.

On the contrary, if the solenoid 67 is operating (FIG. 7B), the movable pin 67a moves downward against the force of the springs 64 and 66. As the movable pin 67a of the solenoid 67 downwardly moves, the cylindrical member 59 enters into rotation from the state as it is in FIG. 7A. This places the slit 59a on the optical path of the laser beam $L_3$.

It must be noted here that the slit driving unit cited above is not proposed in an exclusive sense. A motor or an air cylinder etc. is also a possible substitute for driving the cylindrical member 59. In addition, a member shaped in a polygonal prism may of course be used in place of the cylindrical member 59.

Figure 8A:
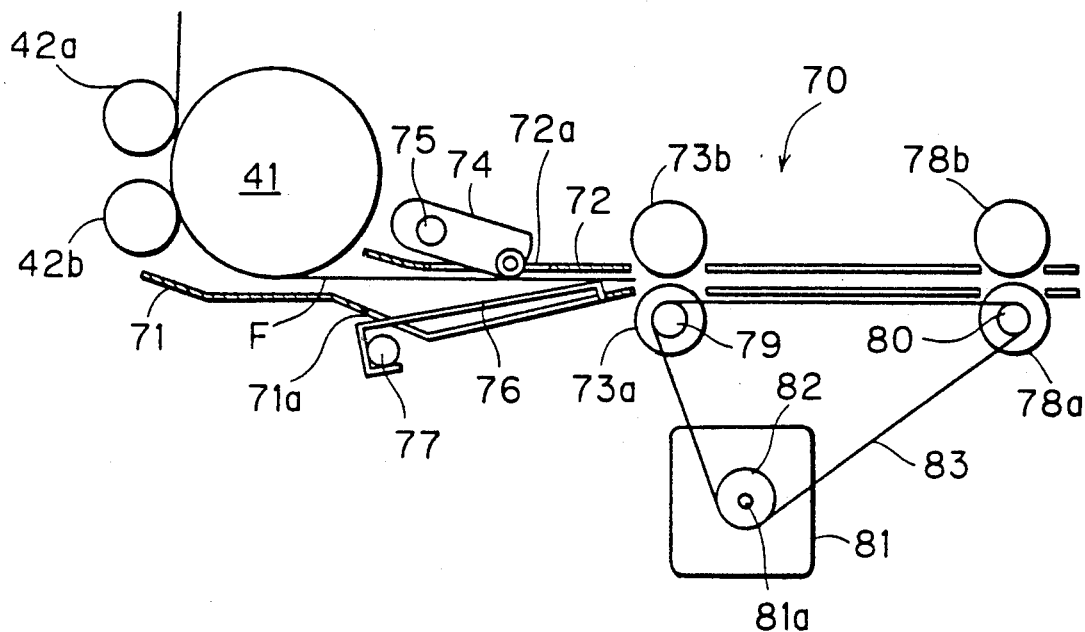
FIGS. 8A and 8B are sectional views of a carrier unit.
Figure 8B:
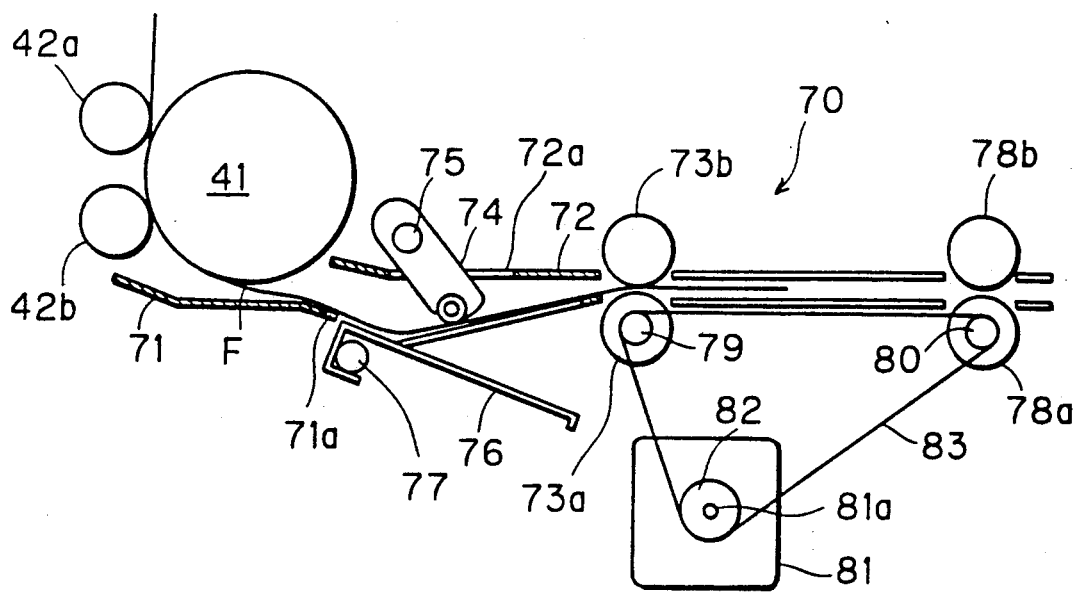

FIGS. 8A and 8B are sectional views of the carrier unit 70, which is disposed near the main roller 41. In the figures, the carrier unit 70 is provided with a lower guide plate 71 which is W-shaped in section. An upper guide plate 72 is attached to the body 5 so as to face the lower guide plate 71. Forwarded by the main roller 41, the film F is guided to a pair of first carrier rollers 73a, 73b through a path between the upper and the lower guide plate 72 and 71.

The upper and the lower guide plate 72 and 71 have through holes 72a and 71a, respectively. An upper plate 74 is rotatably mounted such that it rotates about a pin 75 by its own weight. A slope guide plate 76 is mounted for rotation about a shaft 77 corresponding to the through hole 71a. Though not illustrated in the figures, a slope guide plate driving device is connected to the shaft 77. The slope guide plate 76 is rotated about the shaft 77 by the slope guide plate driving device, whereby a path of the film F is altered depending on necessity.

Besides the first carrier rollers 73a, 73b, the carrier unit 70 comprises a pair of second carrier rollers 78a, 78b. Pulleys 79 and 80 are secured to the rotation shafts of the first and the second carrier roller 73a and 78a, respectively. A pulley 82 is mounted to a rotary shaft 81a of a motor 81. Furthermore, a belt 83 runs over the pulleys 79, 80 and 82 so that the first and the second carrier roller 73a and 78a are driven by the motor 81.

Procedures for recording an image onto a film sheet being in a desired length will now be described.

First, an operator disposes the film case 1 containing a proper size film F in the form of a roll, e.g., an eight-inch-width film F, in a preset position above the body 5. Then, the operator turns a knob (not shown) linked to the reel of the film roll F in order to guide the film F into the body 5 through the opening 6.

The introduction rollers 11a and 11b are not contacting each other during the introduction of the film F into the body 5. This allows the film F to advance between the rollers 11a and 11b and further between the cutters 21 and 21. When the leading edge portion of the film F arrives at a position corresponding to the width detection sensor group $S_2$ (dash-and-dot line in FIG. 5), the width detection sensors $S_{21}$ and $S_{22}$ turn on, so that a light emitting diode provided in the body 5 is turned on. Thus, it is detected that the film F has been set into the image recorder. At the same time, the controller not shown receives signals from the width detection sensors $S_{21}$ and $S_{22}$, and the memory thereof (not shown) stores the data of the width of the film F (8 inches).

According to the first embodiment, as described above, the width detection sensor group $S_2$ automatically detects the width of the film F set into the image recorder; in consequence, incorrect data concerning the width of the film cannot be inadvertently entered. More particularly, when an operator enters film width data in a memory through an operation panel or the like in the current technique, he sometimes enters incorrect film width data during this manual work. However, such an error is completely avoided according to this embodiment. In this respect, the image recorder according to the present invention is superior to conventional image recorders.

Confirming that the light emitting diode is turning on, the operator stops operating the knob. Then, the operator brings the introduction rollers 11a and 11b into contact by operating the lever, whereby the film F is held between the introduction rollers 11a and 11b. Thus, the eight-inch-wide film F is mounted to the image recorder.

After this, the operator pushes a start switch (not shown) of the operation panel. Responding to this, the control unit starts governing operations of the respective units of the image recorder in order to record an image to be reproduced onto the film F.

Figure 9A:
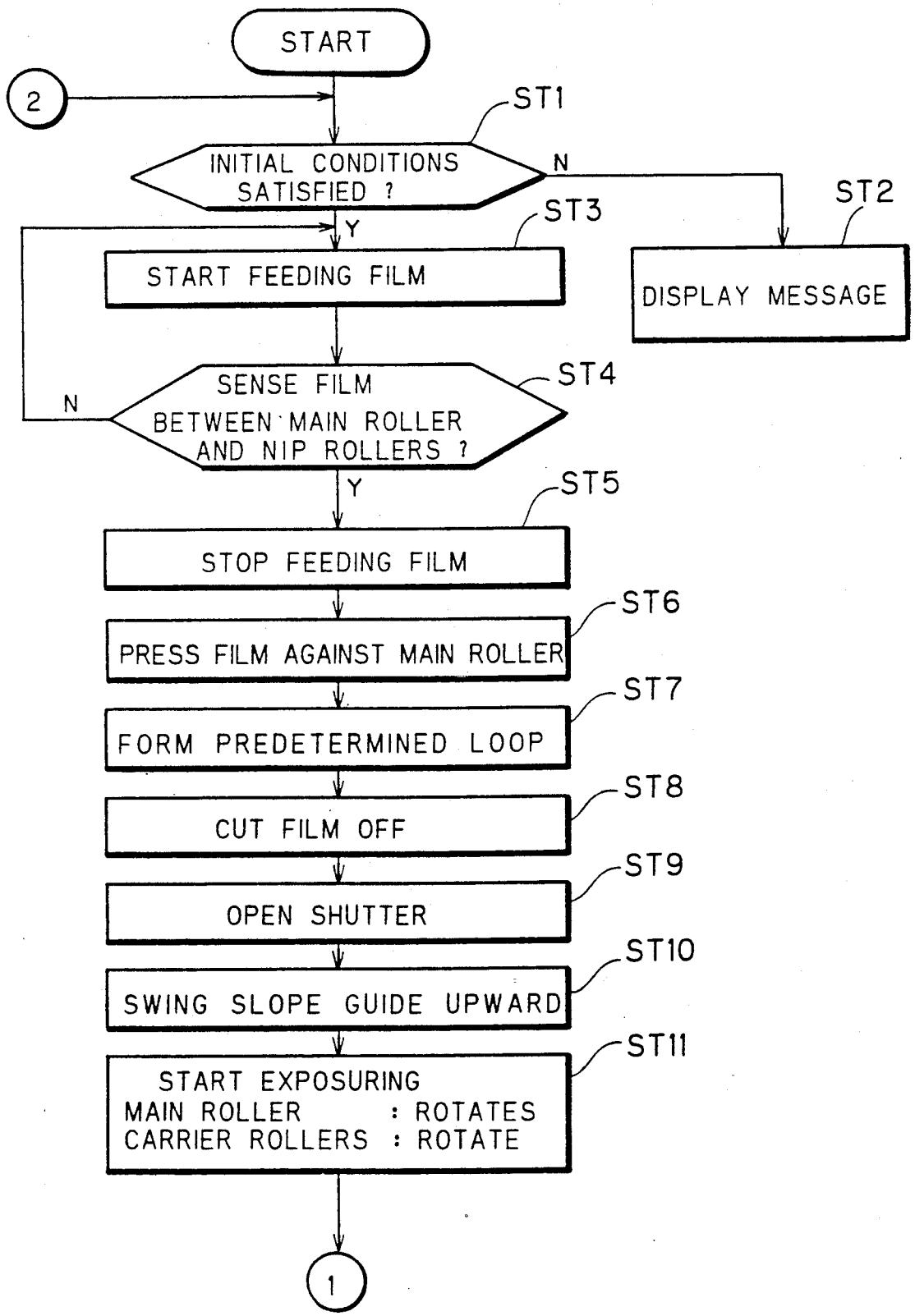
FIGS. 9A, 9B, 10A, and 10B are flow charts of operations of the image recorder, respectively.
Figure 9B:
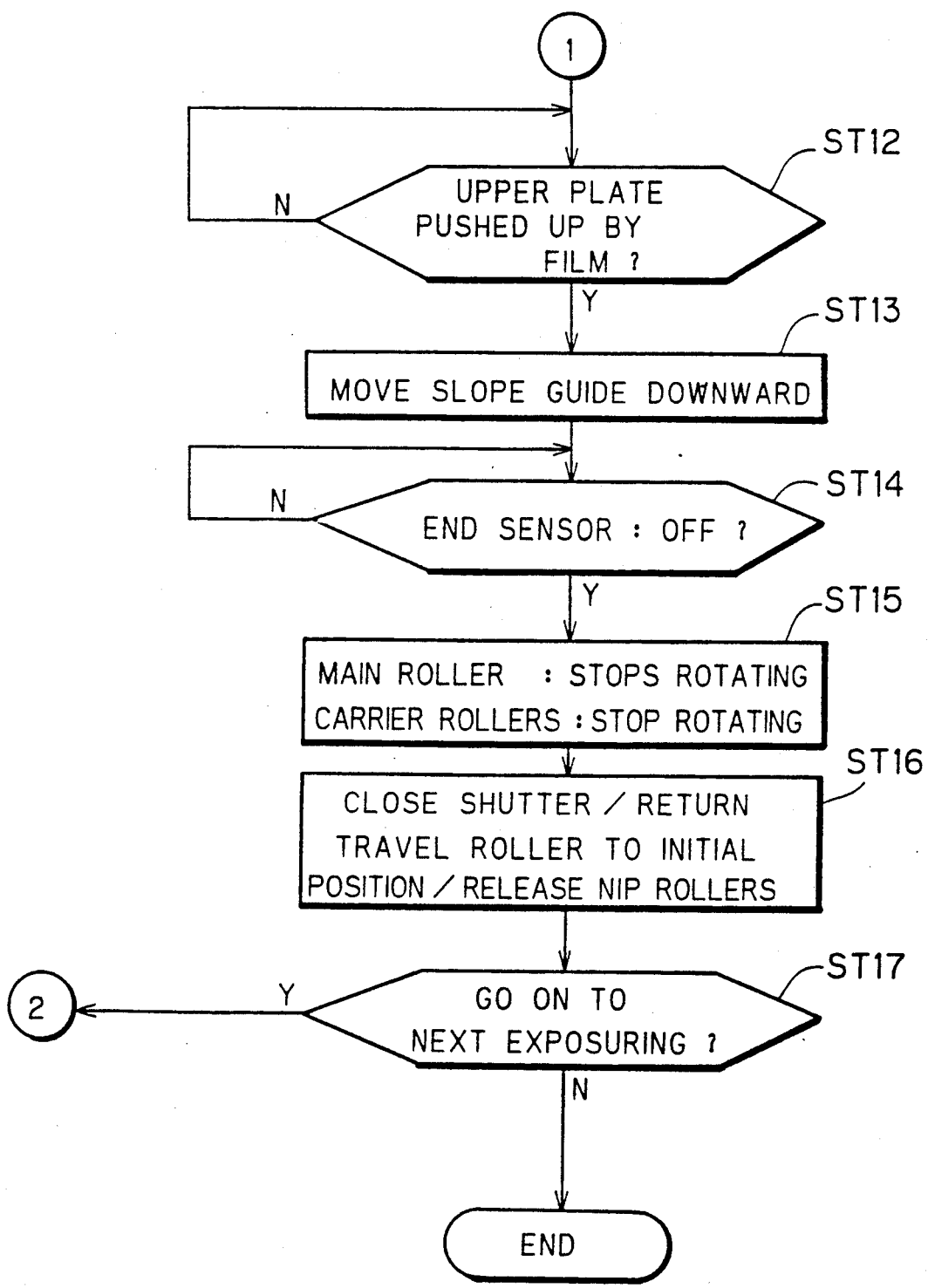

FIGS. 9A and 9B are flow charts of operations of the image recorder. First, whether a preset initial condition is satisfied or not is judged based on signals from sensors or the like of the mentioned respective units of the image recorder (STEP ST1), the initial condition being: the travel roller 34 is placed in its initial position (left end position of FIG. 2); the nip rollers 42a and 42b are each separated from the main roller 41 as in FIG. 6A; and the slit 59a of the cylindrical member 59 is off the optical path of the laser beam $L_3$, blocking off the laser beam $L_3$. If the initial condition is not satisfied, a display of the control unit (not shown) gives a message alarming that the initial condition is not satisfied (STEP ST2).

If the initial condition is satisfied, the control unit orders the motor 13 (see FIG. 4) to rotate the introduction roller 11a. This allows the film F to be fed in the feed scanning direction Y (STEP ST3).

The film F advances between the main roller 41 and the nip rollers 42a and 42b. When the sensor $S_3$ detects the presence of the leading edge portion of the film F (STEP ST4), the control unit orders the motor 13 to stop. This consequently stops the feeding of the film F (STEP ST5).

Next, the nip rollers 42a and 42b move toward the main roller 41 to press the film F against the main roller 41 (STEP ST6).

Explaining this more exactly, the eccentric cam 47 rotates 180 degrees clockwise from its position of FIG. 6A in response to an instruction from the control unit. When the eccentric cam 47 rotates, the force of the springs 44 and 45 urge the operation member 46 to follow the movement of the cam surface 47a. Following the movement of the cam surface 47a, the operation member 46 rotates clockwise about the center portion 46b. This allows the supporting member 43 linked to the operation member 46 to approach the main roller 41 in a manner that the supporting member 43 is inclined at an angle of around 5 degree with respect to the feed scanning direction Y.

Thus, the nip roller 42a tightly contacts the main roller 41, pressing the film F against the surface of the main roller 41 on the point $P_1$ of FIG. 6C.

If the nip roller 42b is not close to the main roller 41 at this step, since the film F is held by the nip roller 42a against the main roller 41 on the point $P_1$, the film F would bend to the left about the point $P_1$ because of its bending force.

In practice, however, the nip roller 42b is close to (even though spaced a certain distance away from) the main roller 41 (see FIG. 6C), pushing the leading edge portion of the film F to the right against the force of the film F to bend to the left. This brings the film F into approximately perfect contact with the main roller 41 between the points $P_1$ and $P_2$.

As the eccentric cam 47 further rotates, the supporting member 43 rotates counter-clockwise as in FIG. 6C, whereby the nip roller 42b moves toward the main roller 41 while urging the leading edge portion of the film F against the main roller 41. On the other hand, the nip roller 42a hardly moves during the rotation of the eccentric cam 47 since the presense of the main roller 41 restricts the position of the nip roller 42a. During that, however, the nip roller 42a is applying tension to the film F which is being urged against the main roller 41. The tension pulls the film F in a direction approximately opposite to the feed scanning direction $(-Y)$. This counter feed scanning direction $(-Y)$ is extending along the circumference of the main roller 41. The film F is provided with the tension in the counter feed scanning direction $(-Y)$ while the leading edge portion thereof is being gradually urged against the main roller 41 as follows: a point at which the film F contacts the main roller 41 successively moves from the point $P_2$ to the point $P_n$ until the nip roller 42b finally contacts the main roller 41.

As seen from the above, perfect contact with the main roller 41 can be attained since the nip roller 42a keeps the film in tension of a counter feed scanning direction $(-Y)$ while the other nip roller 42b continuously presses the film F against the main roller 41.

The introduction roller 11a thereafter once again rotates, feeding the film F in the feed scanning direction Y. In synchronism with this, the travel roller 34 moves in the Z-direction. Thus, a film loop is formed as desired within the travel roller unit 30 (STEP ST7).

In the case where data of a size of a loop required is entered through the operation panel in advance, the introduction roller 11a keeps rotating until an accumulated cycle value of the introduction roller 11a or the motor coincides with the value in correspondence with the loop size previously entered. On the contrary, if size data of the desired loop is not entered beforehand, the introduction roller 11a will stop rotating at the time the film F has fed an initially determined length.

Following this, the cutter driving device is actuated responsive to an instruction received from the control unit. The cutters 21, 21 close and cut off the film F (STEP ST8), whereby a sheet of eight-inch-wide film of a desired length is produced (hereinafter referred to only as a "sheet").

According to the present image recorder, a sheet length is precisely and simply adjusted by merely adjusting a size of a loop which is formed as beforehand described. In addition, the present image recorder enables a reduced size image recorder. The reason is as follows: It is assumed that a rather long sheet is wanted. In an image recorder without the travel roller unit 30, the main roller 41 and a pair of cutters 21 and 21 must be spaced apart a distance which corresponds to the length of the wanted sheet. This is unneccesary if an image recorder has the travel roller unit 30.

Then, the shutter 58 opens (STEP ST9). The movable pin 67a of the solenoid 67 withdraw to its position shown in FIG. 7B from its position shown in FIG 7A in response to an instruction from the control unit. As the movable pin 67a slides down, the cylindrical member 59 rotates clockwise. The slit 59a is thus provided on the optical path of the laser beam $L_3$ (FIG. 7B). At the same time, the slope guide plate 76 swings upward as shown in FIG. 8A (STEP ST10).

Next, the main roller 41 and the first and the second carrier roller 73a and 78a simultaneously rotate, accordingly the sheet F is fed in the feed scanning direction Y (STEP ST11). In synchronism with rotation of the main roller 41, the laser beam $L_3$, which was modulated in the scanning unit 50 according to an image signal from the control unit, scans the sheet through the shutter 58 in the primary scanning direction X. Thus, an image is recorded on the sheet.

Then, as shown in FIG. 8A, the sheet, sequentially forwarded in the sub scanning direction Y by the main roller 41, is conveyed through a path defined between the upper guide plate 72 and the slope guide plate 76 toward the first carrier rollers 73a, 73b, hence pushing up the upper plate 74. When a loop detection sensor not shown installed in the vicinity of the upper plate 74 detects that the upper plate 74 has been pushed up (STEP ST12), the slope guide plate 76 retracts into its position of FIG. 8B (STEP ST13).

In the further procedures, therefore, the sheet from the main roller 41 will move toward the first carrier rollers 73a, 73b along the lower guide plate 71. Hence, the sheet is loosened between the main roller 41 and the first carrier rollers 73a, 73b while being transported from the main roller 41 to the first carrier rollers 73a, 73b.

As heretofore recited, the film F is cut at a preset position into a desired length sheet (STEP ST8) prior to image recording onto the same, and the sheet is loosened within the carrier unit 70 during conveyance thereof by the carrier unit 70. Thus, no stress is applied to the film sheet. As a result, the sheet would not slip between the main roller 41 and the nip rollers 42a and 42b, which would eventually enable stable feeds.

The sheet thus delivered to the first carrier rollers 73a, 73b is then carried out of the image recorder by the second carrier rollers 78a, 78b.

As in FIG. 2, an end sensor $S_4$ is installed between the first carrier rollers 73a, 73b and the second carrier rollers 78a, 78b. The end sensor $S_4$ keeps detecting the presence of the sheet until the sheet has been carried out of the image recorder. The control unit discharges a signal upon a lapse of a preset period of time after the tail edge of the sheet has passed under the end sensor $S_4$ toward the second carrier rollers 78a, 78b (STEP ST14), in order to stop the main roller 41 as well as the first and second carrier rollers 73a and 78a (STEP ST15). Then, the shutter 58 closes and the travel roller 34 retracts into its initial position, and concurrently the nip rollers 42a and 42b are released (STEP ST16).

More exactly, the eccentric cam 47 is driven to eccentrically rotate 180 degrees counter-clockwise from its position of FIG. 6B in response to an instruction from the control unit. This allows the supporting member 43 linked to the end portion 46a of the operation member 46 to move to the left against the force of the springs 44 and 45, whereby the nip rollers 42a and 42b are separated from the main roller 141.

Thus, one cycle of operation is completed. Then, whether the image recorder will conduct subsequent image recording or not is determined (STEP ST17). If it is determined that image recording will be successively conducted, the procedures as heretofore described will be repeated from STEP ST1. Carrying out the procedures repeatedly, the image recorder consecutively produces sheets with a desired image recorded thereon and discharges them by means of the carrier unit 70.

As explained above, in the image recorder according to the present invention, the film F is cut off by the cutters 21 and 21 prior to image recording by means of the expose-scanning unit 40 (STEP ST8) thereby to produce a sheet of a preset length, whereafter an image is reproduced on the sheet. Therefore, a sheet needs not to be fed in a counter feed scanning direction after exposure thereon. This allows the novel image recorder to omit a unit which is indispensable for a conventional image recorder to reversely feed a film. Hence, a simple structure image recorder with a short cycle time can be attained.

Second Embodiment

Figure 10A:
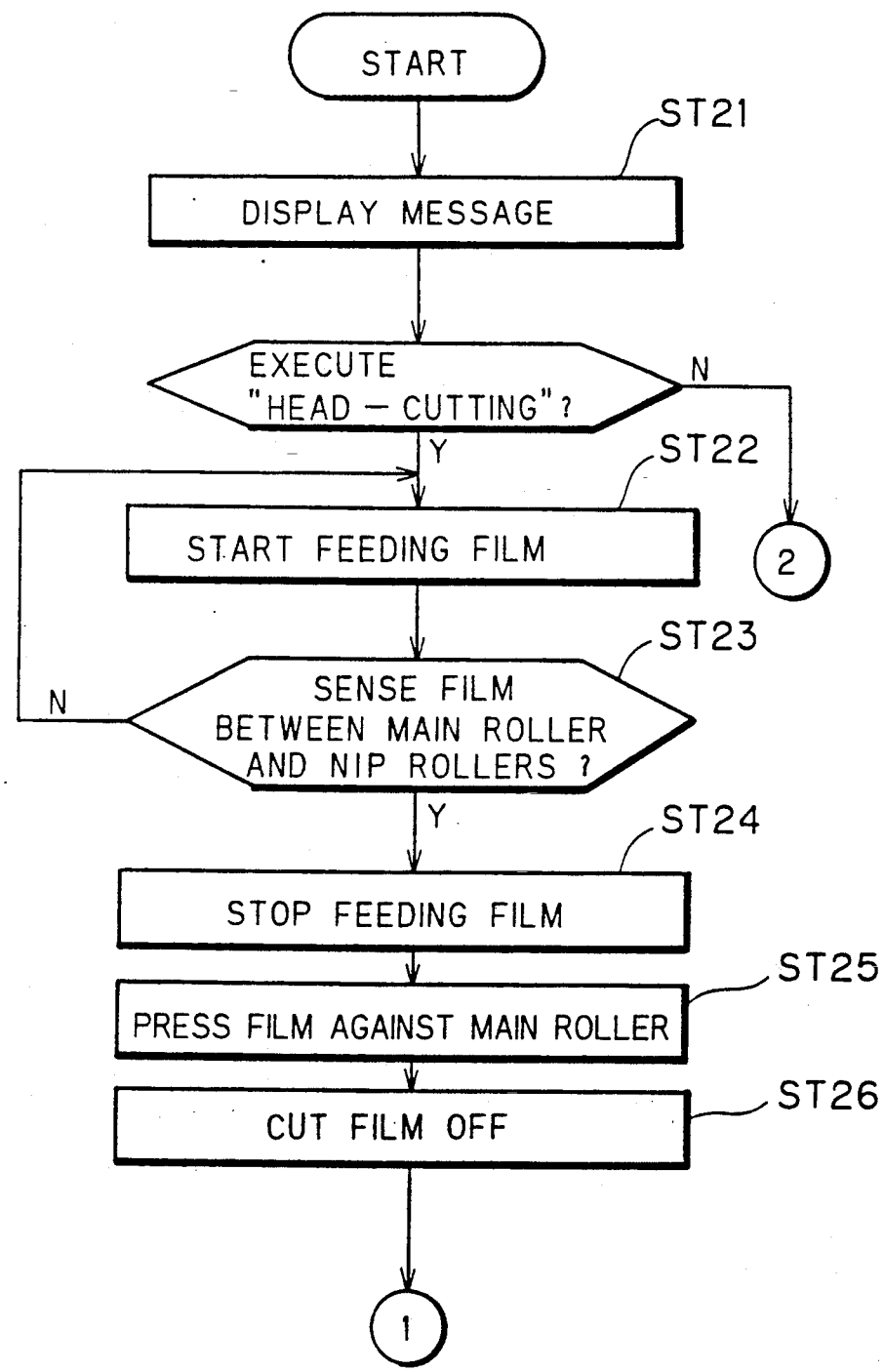
Figure 10B:
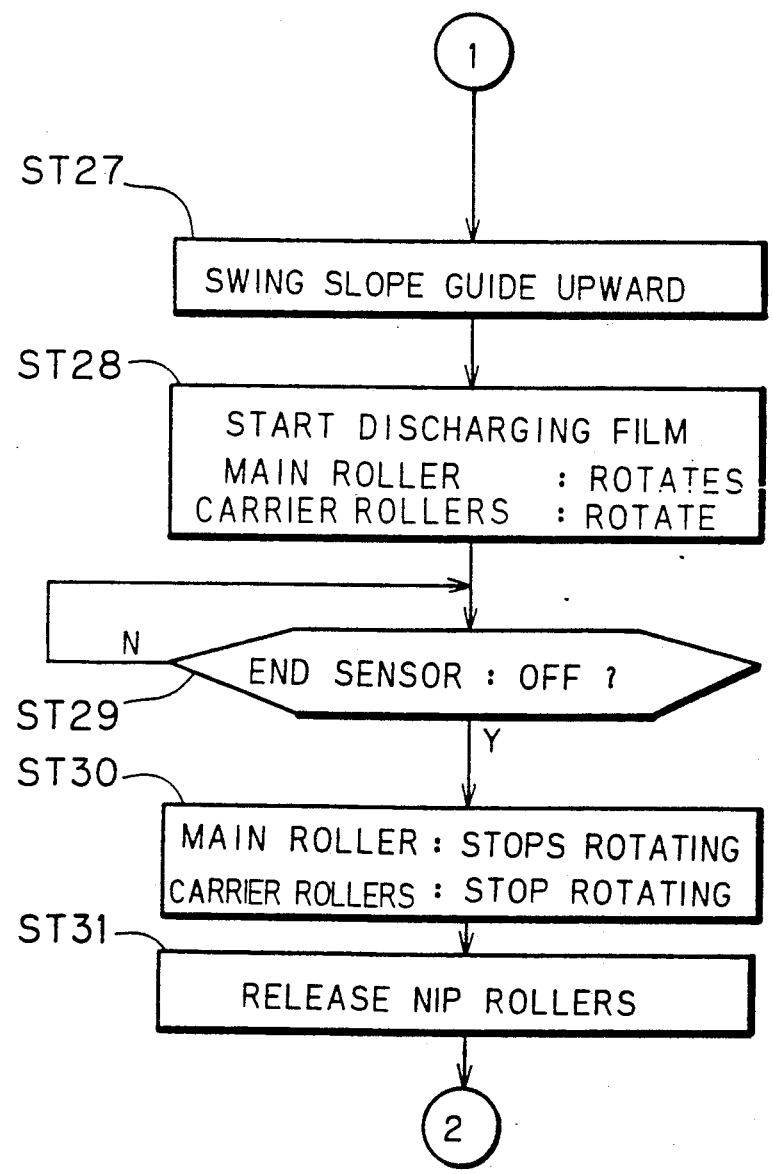

In mounting the film case 1 containing film F in the form of a roll to the body 5, the leading edge portion of the film F is often exposed. In order to overcome this problem, the image recorder of the present invention has a "head-cutting" function as explained in the following:

FIGS. 10A and 10B are flow charts explaining "head-cutting". When the operator has finished mounting the roll of the film F to the image recorder as described above, a display of a control unit shows a message asking the operator whether the image recorder proceeds to "head-cutting" or not (STEP ST12). If the operator decides not to perform "head-cutting" and pushes a start switch of the control unit, the image recorder starts consecutive production of sheets which have an image reproduced thereon.

On the other hand, if the operator pushes a switch for "head-cutting," the film F starts to be fed in the feed scanning direction Y while being held between introduction rollers 11a and 11b. The film F is stopped when the leading edge portion (i.e., the head portion) thereof reaches a position between a main roller 41 and nip rollers 42a and 42b (STEP ST 22).

Then, the leading edge portion of the film F reaches a position between the main roller 41 and the nip rollers 42a and 42b (STEP ST23). When a sensor $S_3$ mentioned before detects this, a motor 13 stops further feeding the film F in response to an instruction from the control unit (STEP ST24).

After STEP ST24, the nip rollers 42a and 42b presses the film F against the main roller 41 (STEP ST25), similarly to STEP ST 6 in the first embodiment.

Next, in response to a signal from the control unit, the cutter driving device drives so that the cutters 21 and 21 close. Accordingly, the film F is cut off (STEP ST26) and a partially exposed sheet is produced.

Then, the slope guide plate 76 swings upward (STEP ST27, FIG. 8A), and the main roller 41 and the first and the second carrier rollers 73a and 78a start rotating simultaneously. This permits the sheet, which is being held between the main roller 41 and the nip rollers 42a and 42b, to follow the path between the upper guide plate 72 and the slope guide plate 76 toward the first carrier rollers 73a, 73b.

The sheet thus conveyed to the first carrier rollers 73a, 73b is finally carried out of the image recorder through second carrier rollers 78a, 78b.

The end sensor $S_4$ keeps detecting the presence of the sheet during this stage. The tail edge of the sheet passes under an end sensor $S_4$ toward the second carrier rollers 78a, 78b at a certain point (STEP ST29). Upon a lapse of a preset period of time after this point, the main roller 41 and the first and second carrier roller 73a and 78a stop rotating (STEP ST30).

At last, the nip rollers 42a and 42b are released (STEP ST31). Thus, "head-cutting" is completed, and the image recorder proceeds to image recording onto the film F as described before.

Third Embodiment

The present invention solves still another problem, namely, the problem regarding film drop. The problem and the solution thereof will now be described.

As well known, the tail edge of a long film F is not fixed to a reel, and the film F is only rolled around the reel in the form of a roll. If a length of film roll left in the film case is shorter than a length of a film to be fed (i.e., the feed length), the tail edge portion of the remaining film loses its contact with the reel while being fed toward a main roller by introduction rollers. This causes the tail edge portion to pass the introduction rollers before nip rollers hold the leading edge portion of the remaining film against the main roller. In other words, the film fails to be held by the rollers and drops within the image recorder. This would often cause a trouble. In order to solve this problem, an image recorder embodied by the first embodiment is improved (described later).

Figure 11A:
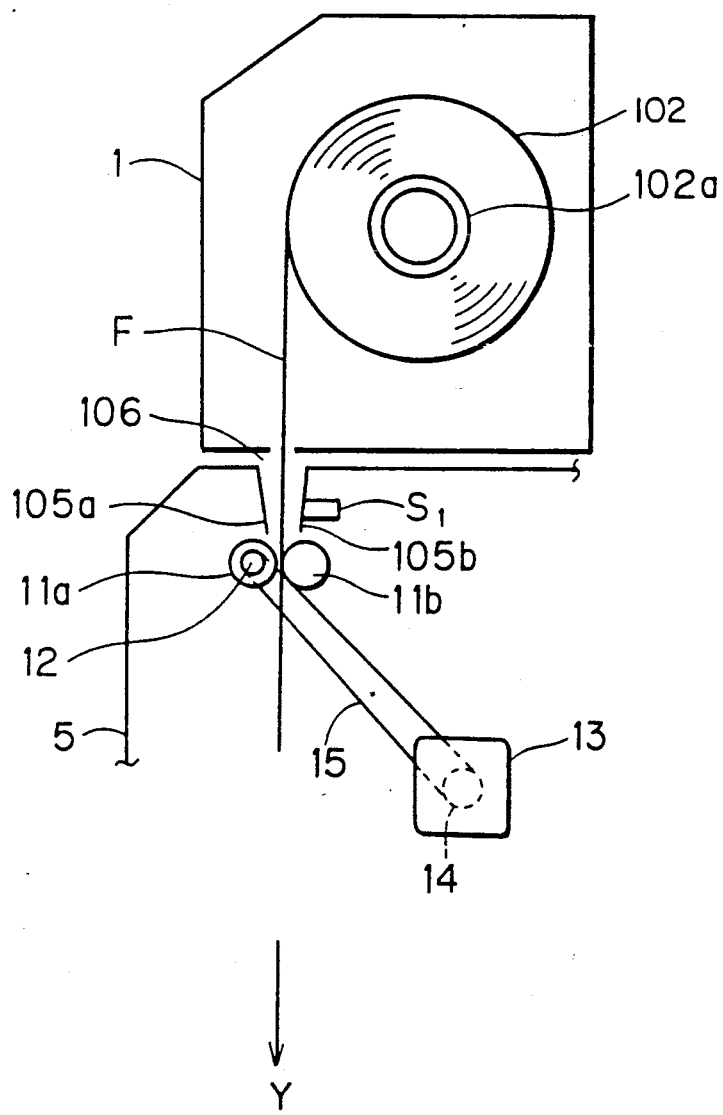
FIGS. 11A and 11B are partially enlarged views of an image recorder according to the third embodiment.
Figure 11B:
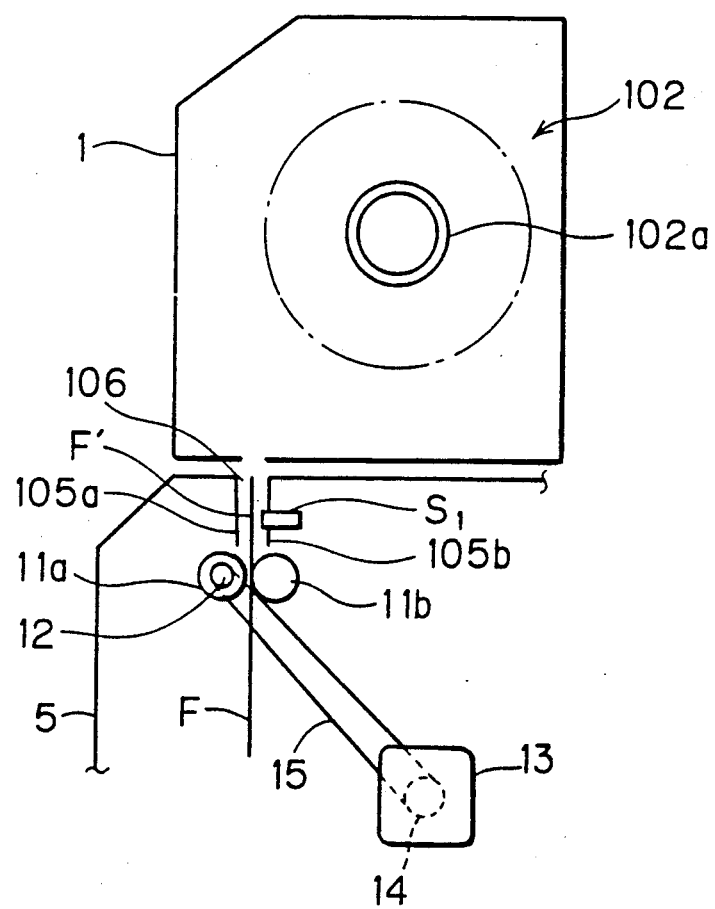

FIGS. 11A and 11B are partially enlarged views of the improved image recorder according to the third embodiment. The improved image recorder has an opening 106 on its top frame (FIG. 11A). The opening 106 is placed correspondingly to the position of a film case 1 which is mounted above a body 5. The film F is drawn out of a roll 102 and then is introduced into the body 5 through the opening 106. Sloping guide plates 105a and 105b are provided around the opening 106 in the body 5.

A pair of introduction rollers 11a and 11b are mounted for rotation to the body 5 just beneath the sloping guide plates 105a and 105b. A sensor for detecting tail edge portion $S_1$ is mounted on the sloping guide plate 105b which is between the opening 106 and the introduction roller 11b (FIG. 11A). The sensor $S_1$ includes a laser beam projector and a laser beam receiver. While the film F is at a position corresponding to the sensor $S_1$, therefore, a laser beam from the laser beam projector is reflected at the back surface of the film F and enters the laser beam receiver. The laser beam receiver keeps providing a detection signal to a control unit as far as it receives a reflected laser beam. As a result, the tail edge portion of the film F is detected by the sensor $S_1$.

Other structures and image recording procedures of the image recorder of the third embodiment are omitted since they are the same with that of the first embodiment.

Now, turning to a case where amount of remaining film roll 102 is very small and therefore the length thereof is far shorter than the feed length. If the image recorder conducts the series of operations for image recording heretofore recited, the problem regarding film drop will occur. Detailed explanation of the problem is as follows:

As the introduction rollers 11a and 11b feed the film (Step ST3), the tail edge portion (i.e., F') of the film loses its contact with the reel 102a before passing the sensor $S_1$ (FIG. 11B). To make the matters even worse, the tail edge portion F' often passes the introduction rollers 11a and 11b before the nip rollers 42a and 42b hold the leading edge portion of the film F against the main roller 41.

Being failing to be held, the film F drops within the image recorder by its own weight. In the third embodiment, therefore, the sensor for detecting tail edge portion $S_1$ is employed order to prevent such a problem.

More particularly, at the beginning of Step ST3, a portion of the film F has been already located at the position corresponding to the sensor $S_1$ (FIG. 11A). Hence, a laser beam from the laser beam projector of the sensor $S_1$ is reflected at the back surface of the film F, and the reflected laser beam receiver receives the same. Thus, the sensor $S_1$ detects the presence of the film F and sends a detection signal to the control unit.

Then, Step ST3 is carried out. The introduction rollers 11a and 11b start feeding the film F in the feed scanning direction. During this, the sensor $S_1$ continuously detects the presence of the film F. If the tail edge portion F' passes the sensor $S_1$ during the feeding by means of the introduction rollers 11a and 11b (FIG. 11B), a laser beam from the laser beam projector of the sensor $S_1$ will fail to be reflected at the back surface of the film F, whereby the sensor $S_1$ detects that the tail edge portion F' has passed the same.

When the sensor $S_1$ has detected that the tail edge portion F' has passed the same, a sub control unit gives an instruction to the motor for driving introduction roller 11a and deactivates the same, to stop rotation of the introduction roller 11a (FIG. 11B). In consequence, the introduction rollers 11a and 11b hold the film F in the vicinity of the tail edge portion F' (FIG. 11B), whereby the film F is prevented from dropping. A display not shown of the main control unit gives a message informing the holding of the remaining film as soon as the introduction roller 11a stops.

The operator, acknowledging this, detached the film case 1 from the body 5. Next, the operator pushes a switch not shown to take out the remaining film F which is held by the introduction rollers 11a and 11b (FIG. 11B). In response to this, the sub control unit operates the motor for driving introduction roller 11a to reversely rotate. Thus, the remaining film F is drawn out of the body 5, i.e., out of the image recorder, through opening 106.

In this third embodiment the image recorder employs a so called reflecting type sensor as the sensor $S_1$ for detecting a tail edge portion. Still, it will be appreciated that this choice is not limiting. A transmitting type sensor, for example, is also employable.

In Step ST7 for forming a loop, when amount of remaining film is very small, the tail edge portion F' often loses its contact with the reel 102a as the film F is fed by the introduction rollers 11a and 11b, and passes the sensor for detecting tail edge portion $S_1$ (FIG. 11B). Even in this case, the nip rollers 42a and 42b prevent the film F from dropping since they are holding the leading edge portion of the film F against the main roller 41.

Thus, the introduction roller 11a does not have to stop rotating every time the sensor $S_1$ detects the tail edge portion F'. However, it is likely that the film does not have a predetermined length required for image recording. In order to draw the film F out of the image recorder, the introduction roller 11a may stop rotating concurrently with the detection of the tail edge portion F' by the sensor $S_1$, so that in response to an operator's instruction the nip rollers 42a and 42b are separated from the main roller 41 and the introduction roller 11a is rotated.

Other Embodiments

It is to be noted here that much more stable feeds can be attained if the surface of the main roller 41 is roughly finished in the present embodiments. More particularly in other words, if the surface of the main roller 41 is finished properly rough, the ability of the surface of the main roller 41 to hold the back surface of the film F, i.e., the gripping power of the main roller 41, will be increased. This enables more efficient prevention of slipping of a sheet between the main roller 41 and the nip rollers 42a and 42b, in turn enabling the sheet to be fed much more stably than in the aforesaid embodiments. Among recognized available methods of finishing the surface of the main roller 41: a method wherein a substance such as $Al_2O_3$ or WC is welded and sprayed over the surface of the main roller 41; sandblasting onto the surface of the main roller 41.

In the embodiments of the present invention, the nip roller 42a is urged toward the main roller 41 before the nip roller 42b is; however, it is appreciated that executing this operation vice versa does not lessen the effect of the embodiments.

Although the present invention has been described and illustrated in detail, it is clearly understood that the same is by way of illustration and example only and is not to be taken by way of limitation. The spirit and scope of the present invention should be limited only by the terms of the appended claims.

What is claimed is:

1. Apparatus for recording an image, comprising:
   means for feeding a photosensitive material in a first direction;
   means for loosening said photosensitive material in a second direction approximately perpendicular to the first direction, said loosening means being positioned downstream from said feeding means relative to said first direction;
   means for controlling said feeding means and said loosening means in cooperative operation, whereby a predetermined length of said photosensitive material is fed and loosened unless an alternative length therefor is selected by a user operating said control means;
   means, disposed between said feeding means and said loosening means, for cutting off said photosensitive material, whereby a sheet of photosensitive material is cut off from said photosensitive material, said photosensitive material sheet being of said predetermined or selected length as desired; and
   means for recording an image to be reproduced onto said photosensitive material sheet.

2. An apparatus of claim 1, wherein said loosening means includes a travel roller, said travel roller sliding in the second direction, to thereby form a loop of said photosensitive material sheet extending to said recording means to be drawn while in externally urged contact therewith for recording of said image on said photosensitive material sheet.

3. An apparatus for recording an image, comprising:
   means for feeding a photosensitive material in a first direction;
   means for loosening said photosensitive material in a second direction approximately perpendicular to the first direction, said loosening means being positioned downstream from said feeding means relative to said first direction;

means, disposed between said feeding means and said loosening means, for cutting said photosensitive material, whereby a sheet of photosensitive material is cut off from said photosensitive material, said photosensitive material sheet being of a predetermined length; and means for recording an image to be reproduced onto said photosensitive material sheet, wherein said recording means comprises a main roller extending in a third direction approximately perpendicular to both the first and the second direction; and a nip roller unit for urging said photosensitive material sheet toward said main roller.

4. An apparatus of claim 3, wherein said nip roller unit includes:

a pair of nip rollers extending in parallel to said main roller;

two supporting members for supporting said nip rollers, each of said supporting members being close to ends of said main roller; and a mechanism, coupled to said supporting member, for moving said supporting member toward said main roller, whereby said nip rollers press said photosensitive material sheet against said main roller.

5. An apparatus of claim 3, wherein said main roller has a surface which is roughly finished.

6. An apparatus of claim 3, wherein a surface of said main roller is coated with $Al_2O_3$ or WC.

7. An apparatus of claim 3, wherein a surface of said main roller is sandblasted.

8. An apparatus of claim 4, further comprising: a sensor for detecting a leading edge portion of said photosensitive material, said sensor being positioned downstream from said main roller relative to said first direction.

9. An apparatus of claim 8, wherein said feeding means stops feeding said photosensitive material when said sensor has detected the leading edge portion.

10. An apparatus for recording an image, comprising:

means for feeding a photosensitive material in a first direction;

means for loosening said photosensitive material in a second direction approximately perpendicular to the first direction, said loosening means being positioned downstream from said feeding means relative to said first direction;

means, disposed between said feeding means and said loosening means, for cutting off said photosensitive material, whereby a sheet of photosensitive material is cut off from said photosensitive material, said photosensitive material sheet being of a predetermined length;

means for recording an image to be reproduced onto said photosensitive material sheet; and a sensor for detecting an ending edge portion of said photosensitive material, said sensor being positioned upstream for said feeding means relative to said first direction.

11. The apparatus according to claim 10, wherein said feeding means stops feeding said photosensitive material when said sensor has detected the ending edge portion.

12. An apparatus for recording an image, comprising:

feeding means for feeding a photosensitive material in a first direction;

recording means for recording an image to be reproduced onto said photosensitive material, said recording means including a main roller, a pair of nip rollers and a mechanism for moving said nip rollers so that said nip rollers are urged toward said main roller or are separated from said main roller, as required;

cutting means, disposed between said feeding means and said recording means, for cutting off said photosensitive material;

loosening means disposed betwen said cutting means and said recording means, said loosening means including a travel roller which is freely movable in a second direction which is approximately perpendicular to the first direction; and control means for controlling drive of said feeding means, said recording means, said cutting means and said loosening means; wherein:

said photosensitive material is fed until a leading edge portion of said photosensitive material reaches the position between said main roller and said nip rollers;

then, said nip rollers urge the leading edge portion toward said main roller;

then, said photosensitive material is fed from said feeding means while loosening between said cutting means and said recording means by said travel roller moving in the second direction;

then, said photosensitive material is cut off, whereby a sheet of photosensitive material is cut off from said photosensitive material, said photosensitive material sheet being of a predetermined length; and an image to be reproduced is recorded onto said photosensitive material sheet.

13. Means for urging a photosensitive material toward a main roller, comprising:

a body, rotatably supporting a main roller;

first and second nip rollers extending in parallel to said main roller and movable to cooperatively hold a length of said photosensitive material in contact with said main roller;

first and second supporting members for movably supporting said first and second nip rollers, said first supporting member being close to one end of said main roller and said second supporting member being close to another end of said main roller; and a mechanism, coupled to said first and second supporting members for moving the same toward said main roller in such an order that said first nip roller is brought into contact with said main roller before said second nip roller contacts said main roller downstream of said first nip roller in a direction of feeding said photosensitive material as said main roller rotates.

14. Means for urging a photosensitive material toward a main roller, comprising:

a body;

first and second nip rollers, extending in parallel to said main roller;

first and second supporting members for supporting said first and second nip rollers, said first supporting member being close to one end of said main roller and said second supporting member being close to another end of said main roller;

a mechanism, coupled to said first and second supporting members, for moving said first and second supporting members toward said main roller so that said first and second nip rollers are correspondingly brought into contact with said main roller in order, wherein said mechanism comprises, for each of said first and second supporting members a first spring having one end portion which is linked to one end portion of the corresponding supporting member and another end portion which is linked to said body, a second spring having an end portion which is linked to another end portion of the corresponding supporting member and another end portion which is linked to said body, whererby said first and said second springs apply pulling force to said supporting member in cooperation with each other so that said first and second supporting members move toward said main roller, eccentric cam means supported for eccentric rotation with respect to said body, driving means for driving said eccentric cam means, and an operation member mounted for rotation to said body, said operation member having one end portion which is coupled for rotation to a center portion of each of said first and second supporting members, and another end portion which makes sliding contact with said eccentric cam means.

15. Method of recording an image onto a photosensitive material sheet, comprising:

feeding a photosensitive material in a first direction by a predetermined length;

holding a leading edge portion of said fed photosensitive material at a predetermined recording position for recording of an image on the photosensitive material;

loosening and photosensitive material to thereby form a loop of said photosensitive material, a size of said loop being corresponding to a length of a photosensitive material sheet to be recorded;

cutting off said photosensitive material at a cutting position, said cutting position being located upstream form said loop relative to said first direction, whereby said photosensitive material sheet is cut off from said photosensitive material; and recording an image to be reproduced onto said photosensitive material sheet.

16. Method of claim 15, wherein said step of feeding a photosensitive material includes stopping feeding said photosensitive material when a leading edge portion of said photosensitive material has positioned at a holding position, said holding position being downstream from said loop relative to said first direction.

* * * * *